United States Patent [19]

Wang et al.

[11] Patent Number: 5,809,302
[45] Date of Patent: Sep. 15, 1998

[54] SYSTEM AND METHOD FOR ENABLING POINTERS TO BE PASSED FROM COMPUTER PROGRAMS WRITTEN USING COMPUTER PROGRAMMING LANGUAGES THAT DO NOT SUPPORT POINTERS

[75] Inventors: I-Shin Andy Wang, San Jose; Frederick Thomas Sharp, Menlo Park; Rita Shiao-yuan Wu; John Shek-Luen Ng, both of San Jose; Kuo-Wei Hwang, Milpitas; David Y. Chen, San Jose, all of Calif.

[73] Assignee: International Business Machines Corp., Armonk, N.Y.

[21] Appl. No.: 521,806

[22] Filed: Aug. 31, 1995

[51] Int. Cl.[6] ............................................. G06F 9/44
[52] U.S. Cl. ......................... 395/680; 395/710; 395/685
[58] Field of Search ................................... 395/685, 680, 395/710

[56] References Cited

U.S. PATENT DOCUMENTS 5,369,766  11/1994  Nakano et al. .......................... 395/700
5,515,536  5/1996  Corbett et al. .......................... 395/700

OTHER PUBLICATIONS

"Smart Remote Procedure Calls:Transparent Treatment of Remote Pointers", Kono et al., Distributed Computing System, 1994 Int'l Conf., pp. 142–151.

"Concert/C:Supporting Distributed Programming with Language", Auerbach et al., Distr. Computing System, 1994 Int'l Conf., pp. 152–159.

Primary Examiner—Kevin A. Kriess
Assistant Examiner—Kakali Chaki
Attorney, Agent, or Firm—Prentiss Wayne Johnson; Sterne, Kessler, Goldstein & Fox, pllc

[57] ABSTRACT

Described herein is a system and method for enabling an application to pass a structure containing a pointer member to an external entity, wherein the application represents a computer program executing in a computer system, and the computer program is written in a computer programming language that does not support pointers. The application declares a variable V, a structure type having a member P, and a variable M of the structure type. The application invokes a function written in a computer programming language that supports pointers. A reference to the variable V is passed to the function. The function, when executed, obtains and returns an address of the variable V. The application sets the member P in the variable M equal to the address of the variable V. The application then passes the variable M to an external entity. In this manner, the present invention enables a structure having a pointer embedded therein to be passed to the external entity.

41 Claims, 5 Drawing Sheets

SYSTEM AND METHOD FOR ENABLING POINTERS TO BE PASSED FROM COMPUTER PROGRAMS WRITTEN USING COMPUTER PROGRAMMING LANGUAGES THAT DO NOT SUPPORT POINTERS

CROSS-REFERENCE TO OTHER APPLICATIONS

The following applications of common assignee contain some common disclosure, and are believed to have an effective filing date identical with that of the present application.

"SYSTEM AND METHOD FOR ENABLING A COMPILED COMPUTER PROGRAM TO INVOKE AN INTERPRETIVE COMPUTER PROGRAM," Attorney Docket No. ST9-95-028 (1252.2230000)Ser. No. 07/521,805, incorporated herein by reference in its entirety.

"PLATFORM-TRANSPARENT REGISTRATION AND BUILD OF STORED PROCEDURES AND USER-DEFINED FUNCTIONS," Attorney Docket No. ST9-95-032 (1252.2290000)Ser. No. 07/521,804, now U.S. Pat. No. 5,657,447, incorporated herein by reference in its entirety.

"PASSING STRUCTURES OR ARRAYS AS HOST VARIABLES," Attorney Docket No. ST9-95-027 (1252.2240000)Ser. No. 07/521,710, incorporated herein by reference in its entirety.

"NO PREPROCESSOR AND A SOURCE LEVEL DEBUGGER FOR EMBEDDED SQL IN A 3GL," Attorney Docket No. ST9-95-024 (1252.2270000)Ser. No. 07/521,711, incorporated herein by reference in its entirety.

TECHNICAL FIELD

The present invention relates generally to a system and method for enabling a pointer to be passed from a first executing computer program, written in a language that does not support pointers, to a second executing computer program, written in a language that does support pointers.

BACKGROUND ART

Computer programs written in different computer programming languages are often required to interact during run-time (one program may invoke another program, for example). These computer programming languages do not all support the same set of functions or features. Thus, problems may arise when a first computer program, written in a first computer programming language, is interacting with a second computer program, written in a second computer programming language, and the first computer program is attempting to utilize a feature that is supported by the first computer programming language but not supported by the second computer programming language.

For example, consider the well known BASIC computer programming language. Although some BASIC interpreters provide a means of passing a BASIC variable to an external procedure by reference, that is, as a pointer, BASIC does not support or recognize pointers internally. In the BASIC language you cannot, for example, obtain a value by using a pointer to a variable. Consider a scenario where a program written in BASIC attempts to invoke a procedure written in C (or some other computer language that supports pointers) and where the C procedure requires an argument that is a structure containing a pointer to a variable in the BASIC program. Since BASIC does not support pointers, the BASIC program cannot properly interact with the C procedure; it cannot initialize the required structure containing the pointer.

Thus, what is required is a system and method for enabling a pointer to be passed from a first executing computer program, written in a language that does not support pointers, to a second executing computer program, written in a language that does support pointers.

DISCLOSURE OF INVENTION

Briefly stated, the present invention is directed to a system and method for enabling an application to pass a pointer to an external entity, wherein the application represents a computer program executing in a computer system, and the computer program is written in a computer programming language that does not support pointers. According to the present invention, the application declares a variable V, a structure type having a member P, and a variable M of the structure type. The application invokes a function written in a computer programming language that supports pointers. A reference to the variable V is passed to the function. The function, when executed, obtains and returns an address of the variable V. The application sets the member P in the variable M equal to the address of the variable V. The application then passes the variable M to an external entity. In this manner, the present invention enables a structure having a pointer embedded therein to be passed to the external entity.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF DRAWINGS

The present invention will be described with reference to the accompanying drawings, wherein.

BEST MODE FOR CARRYING OUT THE INVENTION

Figure 1A:
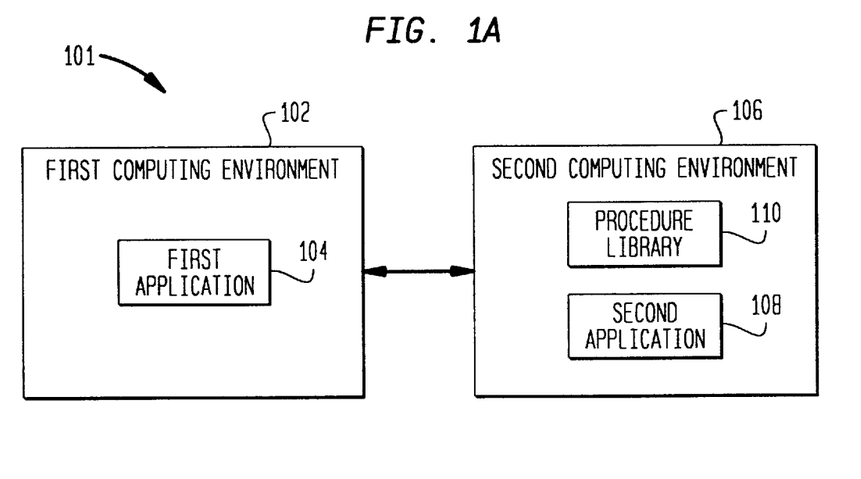
FIG. 1A is a block diagram of a data processing environment according to a preferred embodiment of the present invention.

FIG. 1 is a block diagram of a data processing environment 101 according to a preferred embodiment of the present invention. The data processing environment 101 includes a first computing environment 102 in which a first application 104 executes, and a second computing environment 106 in which a second application 108 executes. The second computing environment 106 also includes a procedure library 110.

The first application 104 interacts with the second application 108 and the procedure library 110. For example, the first application 104 may pass data to the second application 108, or invoke procedures contained in the procedure library 110.

The first computing environment 102 represents a first computer system implemented using a computer such as that shown in FIG. 2 (described in detail below). The first application 104 represents a computer program executing in the first computer system. The first application 104 is written in a first computer programming language that does not support pointers. The first computer programming language may be the well known BASIC computer programming language, or any other language that does not support pointers.

Figure 2:
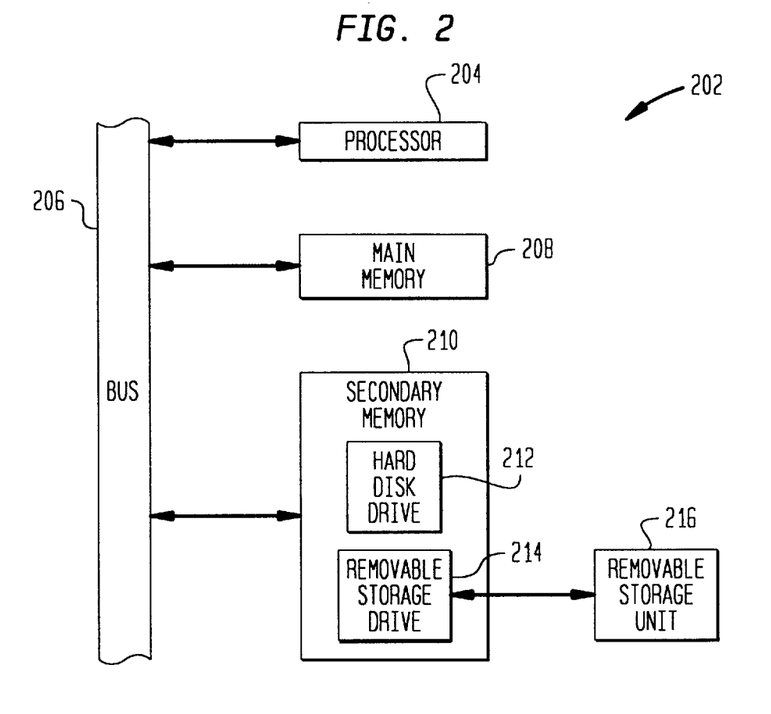
FIG. 2 is a block diagram of a computer system useful for implementing components of the invention.

The second computing environment 106 represents a second computer system implemented using a computer such as that shown in FIG. 2. The second application 108 represents a computer program executing in the second computer system. The second application 108 is written in a second computer programming language that supports pointers (such as C, Fortran, Ada, Cobol, etc.) . The procedure library 110 contains procedures that, when invoked, execute in the second computer system. Preferably, the procedure library 110 is written in the second computer programming language, or any other language that supports pointers.

Referring now to FIG. 2, the computer system 202 includes one or more processors, such as processor 204. The processor 204 is connected to a communication bus 206.

The computer system 202 also includes a main memory 208, preferably random access memory (RAM) , and a secondary memory 210. The secondary memory 210 includes, for example, one or more hard disk drives 212 and/or one or more removable storage drives 214, each representing a floppy disk drive, a magnetic tape drive, a compact disk drive, etc. These devices may be connected directly to the bus 206 or may be connected over a network (not shown). The removable storage drives 214 each reads from and/or writes to a removable storage unit 216 in a well known manner.

Removable storage unit 216, also called a program storage device or a computer program product, represents a floppy disk, magnetic tape, compact disk, etc. As will be appreciated, the removable storage unit 216 includes a computer usable storage medium having stored therein computer software and/or data.

Computer programs (also called computer control logic) are stored in main memory 208 and/or the secondary memory 210. Such computer programs, when executed, enable the computer system 202 to perform the features of the present invention as discussed herein. In particular, the computer programs, when executed, enable the processor 204 to perform the features of the present invention. Accordingly, such computer programs represent controllers of the computer system 202. For example, the first application 104, second application 108, and procedure library 110 represent computer programs executing in one or more computer systems 202.

In another embodiment, the invention is directed to a computer program product comprising a computer readable medium having control logic (computer software) stored therein. The control logic, when executed by the processor 204, causes the processor 204 to perform the functions of the invention as described herein.

Preferably, the first computing environment 102 is implemented using one computer system 202, and the second computing environment 102 is implemented using another computer system 202 (the computer systems 202 being connected via a network, for example). Alternatively, the first and second computing environments 102, 106 may be implemented on the same computer system 202.

Figure 1B:
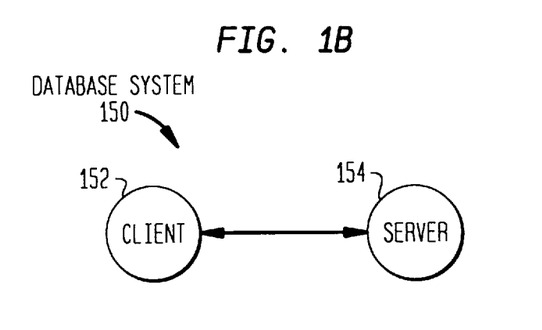
FIG. 1B is a database system representing an application of the invention.

FIG. 1B illustrates a possible application of the invention. Shown in FIG. 1B is a database system 150 comprising a client 152 and a server 154. The database system 150 corresponds to the data processing environment 101, the client 152 corresponds to the first computing environment 102, and the server 154 corresponds to the second computing environment 106.

The server 154 represents a database system, preferably the DB2 database system produced by International Business Machines (IBM) Corporation of Armonk, N.Y. (although any other database system employing a computer programming language that supports pointers could alternatively be used). The procedure library 110 preferably represents a dynamic link library (DLL) that may be called from a BASIC program (i.e., the first application 104). The client 152 interacts with the server 154 to access the services and data offered by the server 154.

Referring again to FIG. 1A, the procedure library 110 includes routines for enabling a pointer to be passed from an application, written in a language that does not support pointers, to another application, written in a language that does support pointers. More particularly, the procedure library 110 includes routines that enable a pointer to be passed from the first application 104 to the second application 108 and/or a procedure of the procedure library 110. These procedures of the procedure library 110 that enable this functionality shall now be described.

Passing a Pointer to a Non-String Variable

Figure 3:
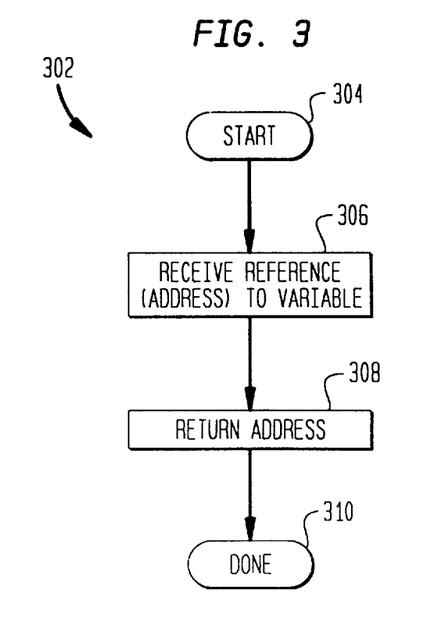
FIGS. 3, 5, 6 and 8 are flowcharts representing the preferred operation of the invention.

According to the present invention, the procedure library 110 includes an ADDR function (ADDR stands for "address"). As indicated by a flowchart 302 shown in FIG. 3, the ADDR function, when executed, receives a reference to a variable (step 306). This reference represents an address of the variable. The ADDR function then returns this address to the calling entity (step 308).

An example implementation of the ADDR function is shown below in Code Example 1 (for illustrative purposes, the ADDR function is written in C, but it should be understood that the ADDR function could alternatively be written in any language that supports pointers).

```
1       void *ADDR (void *p)
2       {
3           return p;
4       }
Code Example 1
```

Line 1 indicates that the ADDR function receives a pointer p, representing a reference (i.e., an address) to a variable (or function). Line 1 also indicates that the ADDR function returns a pointer (i.e., an address). This return of a pointer is performed in line 3, where the pointer p is returned to the calling entity.

Example computer code for invoking the ADDR function is shown in Code Example 2. This code is contained in the first application 104. For illustrative purposes, this code is written in BASIC, but it should be understood that this code could alternatively be written in any language that does not support pointers.

1 declare function ADDR (y as any) as long
2 dim x as integer
3 dim ptr as long
4 ptr=ADDR(x)

CODE EXAMPLE 2

Line 1 of Code Example 2, when executed, operates to declare the function ADDR. (This statement enables the first application 104 to later invoke the function ADDR from the procedure library 110.) Function ADDR as declared in line 1 of Code Example 2 has a passed parameter y, which may be any data type, and returns a long integer.

It is noted that, in 32-bit computer systems, a pointer (or address) is four bytes long. A long integer is also four bytes long. (Generally speaking, the size of a pointer is always equal to the size of a long integer.) Accordingly, a pointer can be represented as a long integer. Thus, line 1 in Code Example 1 is consistent with line 1 in Code Example 2.

Line 2 in Code Example 2 declares x to be an integer variable. Line 3 defines ptr to be a long integer variable. In line 4, the function ADDR from the procedure library 110 is invoked. According to the present invention, execution of line 4 is such that a reference to variable x is passed to the function ADDR in the procedure library 110 (such operation is standard, since the variable x merely represents a location in memory). In other words, the address of variable x is passed to the function ADDR. The function ADDR operates as described above, and sets ptr equal to the address of variable x.

Passing a Pointer to a String Variable

The ADDR function described above can be used with variables of most, if not all, data types. However, in systems that employ handles to strings, the ADDR function cannot be used with string variables.

Figure 4:
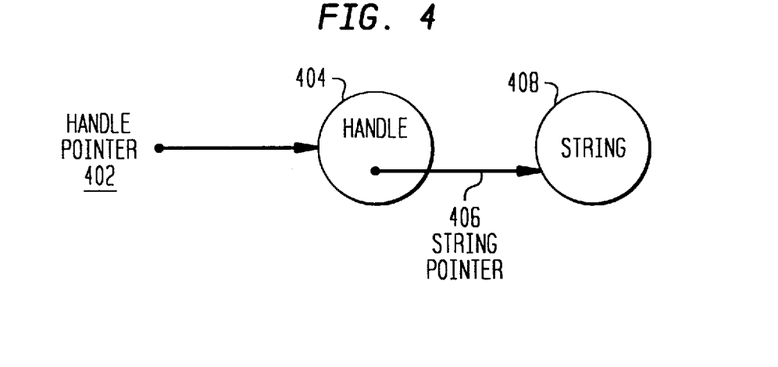
FIG. 4 illustrates a string representation.

Consider the scenario presented in FIG. 4. A string variable 408 is addressed by a string pointer 406. The string pointer 406 is not directly accessible, however. Instead, the string pointer 406 is stored in a handle 404 that is associated with the string variable 408. A handle pointer 402 addresses the handle 404. The handle pointer 402, not the string pointer 406, is what is available to applications to access string variables. (Handles are used for memory management reasons. Often times, strings must be moved from one location in memory to another. In such cases, the string pointers stored in the associated handles must be modified. However, it is not necessary to modify the handle pointers. Thus, the handle pointers represent an indirect but stable mechanism for accessing strings.)

Consider Code Example 3, where an attempt is made to use the ADDR function with a string variable s.

1 declare function ADDR (y as any) as long
2 dim s as string
3 dim ptr as long
4 ptr=ADDR(s)

CODE EXAMPLE 3

Assume that the system in which this code is executed maintains strings as shown in FIG. 4, such that s references the handle 404, instead of the string 408. In this case, the ADDR function would return the address of the handle 404, instead of the address to the string variable 408. This is not the desired result. Instead, it is desired to return the address of the string variable 408.

According to the present invention, an $ADDR_{13}STRING$ function is also stored in the procedure library 110. This function is invoked for string variables in those systems that maintain string variables as shown in FIG. 4.

Figure 5:
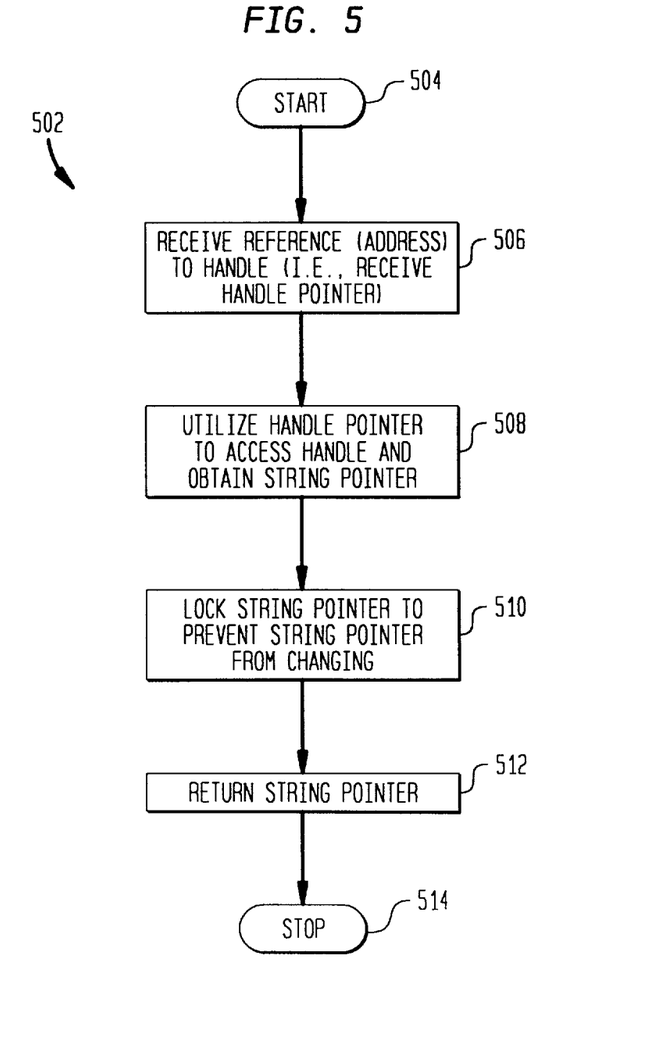

The $ADDR_{13}STRING$ function, when invoked, performs the steps shown in a flowchart 502 of FIG. 5. Specifically, the $ADDR_{13}STRING$ function receives a reference to a handle 404 (step 506). This reference represents an address of the handle 404 (i.e., the handle pointer 402). The $ADDR_{13}STRING$ function utilizes the handle pointer 402 to access the handle 404 and retrieve the string pointer 406 stored therein (step 508). The $ADDR_{13}STRING$ function then locks this string pointer 406 so as to prevent the string variable 408 from moving from one memory location to another. Finally, the $ADDR_{13}STRING$ function returns the string pointer 406. Later, the locked string either is abandoned when the variable goes out of scope or when the program terminates (during which the system frees memory associated with the program), or is explicitly unlocked by the user by using another function provided by the present invention, called $UNLOCK_{13}STRING$ (implementation of $UNLOCK_{13}STRING$ will be apparent to persons skilled in the relevant art(s)).

An example implementation of the $ADDR_{13}STRING$ function is shown below in Code Example 4 (for illustrative purposes, the $ADDR_{13}STRING$ function is written in C, but it should be understood that the $ADDR_{13}STRING$ function could alternatively be written in any language that supports pointers).

```
1      void *ADDR_STRING (void *handle_ptr)
2      {
3         void *p;
4         p = dereference_handle_pointer (handle_ptr);
5         lock (p)
6         return p;
7      }
Code Example 4
```

Line 1 indicates that the $ADDR_{13}STRING$ function receives a handle pointer 402, representing a reference (i.e., an address) to a handle 404. Line 1 also indicates that the $ADDR_{13}STRING$ function returns a pointer (i.e., an address). In line 3, a pointer p is declared. In line 4, a function called "$dereference_{13}handle_{13}pointer$" is called. The $dereference_{13}handle_{13}pointer$ function receives the handle pointer 402, uses the handle pointer 402 to access the handle 404, and retrieves the string pointer 406 contained in the handle 404. The $dereference_{13}handle_{13}pointer$ function is preferably part of a run-time library provided by the second computer programming language. Implementation of the $dereference_{13}handle_{13}pointer$ function will be apparent to persons skilled in the relevant art(s).

The $dereference_{13}handle_{13}pointer$ function returns the string pointer 406. Pointer variable p is set equal to the string pointer 406.

In line 5, a lock function is called to lock the string variable 408 referenced by the string pointer 406. The lock function is preferably part of a run-time library provided by the second computer programming language. Implementation of the lock function will be apparent to persons skilled in the relevant art(s).

In line 6, the string pointer 406 is returned to the calling entity.

Example computer code for invoking the $ADDR_{13}STRING$ function is shown in Code Example 5. This code is contained in the first application 104. For illustrative purposes, this code is written in BASIC, but it should be understood that this code could alternatively be written in any language that does not support pointers.

1 declare function $ADDR_{13}STRING$ (y as any) as long
2 dim s as string
3 dim ptr as long
4 ptr=$ADDR_{13}STRING$(s)

CODE EXAMPLE 5

Line 1 of Code Example 5, when executed, operates to declare the function $ADDR_{13}STRING$. (This statement enables the first application 104 to later invoke the function ADDR$_{13}$STRING from the procedure library 110.) Function ADDR$_{13}$STRING as declared in line 1 of Code Example 2 has a passed parameter y, which may be any data type, and returns a long integer.

Line 2 in Code Example 2 declares s to be a string variable. Line 3 defines ptr to be a long integer variable. In line 4, the function ADDR$_{13}$STRING from the procedure library 110 is invoked. The function ADDR$_{13}$STRING operates as described above and sets ptr equal to the string pointer 406.

Passing a Pointer to an Array Variable

Passing a pointer to a string variable is a special case of passing a pointer to a language construct that has an external or internal structure. The beginning of the structure is not necessarily the same as the beginning of the data value in the structure. Another such language construct is an array (although the following applies to any simple or complex data type or structure for which the beginning of the data type/structure is not necessarily the same as the beginning of the data value in the data type/structure).

ADDR and ADDR$_{13}$STRING can be used for most scalar variables in BASIC; however, they cannot be used for returning the address of the first element of an array in a language such as BASIC. Like the handle structure for a string variable, an array variable may begin with an internal descriptor structure, which specifies, for example, its data type, its dimensions, and the upper and lower bound for each dimension. Furthermore, in BASIC, an array of varying length strings in an array does not give its true address because the value of the fixed length string is copied to a varying length string for the purpose of calling an external procedure.

Some procedures that should be callable from a language such as BASIC require the address of the first element of a string array in which each element is sequential in a contiguous block of memory. One such procedure is the well known ODBC API SQLExtendedFetch, which requires that the address of the first element of an array be bound, using SQLBindCol, to each column in the result set to be fetched.

Figure 7:
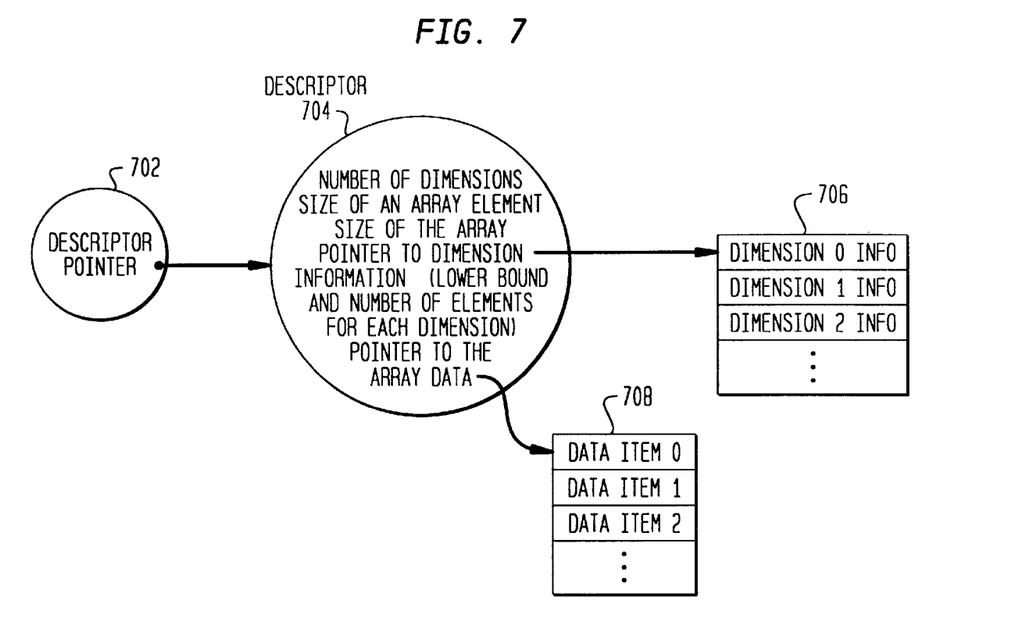
FIG. 7 illustrates an array representation.

A third procedure of the procedure library 110, ADDR$_{13}$ARRAY, therefore, returns a pointer to the first element of an array variable (more generally, the ADDR$_{13}$ARRAY function returns a pointer to a memory location containing the data associated with the variable). This function is invoked for array variables in those systems that maintain array variables as shown in FIG. 7. FIG. 7 shows a descriptor pointer 702 that points to an array descriptor 704 (implemented as a structure). The array descriptor 704 has fields that store the following information: number of dimensions in array, size of an array element, size of the array, a pointer to dimension information 706 (i.e., the lower bound and the number of elements for each dimension), and a pointer to the array data 708.

Figure 8:
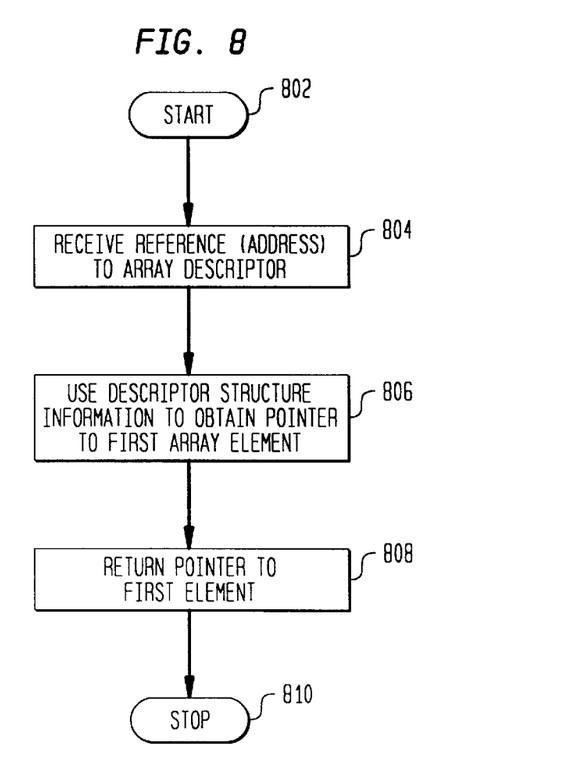

The operation of the ADDR$_{13}$ARRAY function is illustrated in flowchart form in FIG. 8. The ADDR$_{13}$ARRAY function receives a reference to an array descriptor 702 (step 804). This reference represents an address of the descriptor 704. The ADDR$_{13}$ARRAY function uses the information contained in the descriptor 704 to obtain a pointer to the first element of the array (i.e., data item 0 in the array information 708). This occurs in step 806. The ADDR$_{13}$ARRAY function returns this pointer to the first array element (step 808).

(While the invention has been described with reference to an array, it should be understood that the ADDR$_{13}$ARRAY function could be used with little or no modifications with any simple or complex data type or structure for which the beginning of the data type/structure is not necessarily the same as the beginning of the data value in the data type/structure. Any needed modifications to the ADDR$_{13}$ARRAY function would be apparent to persons skilled in the relevant art(s).)

An example implementation of the ADDR$_{13}$ARRAY function is shown below in Code Example 6 (for illustrative purposes, the ADDR$_{13}$ARRAY function is shown below as being written in C, but it should be understood that the ADDR$_{13}$ARRAY function could alternatively be written in any language that supports pointers).

```
1   typedef struct ArrayTag *PArray;
2   typedef struct ArrayTag {
3       int uiNumDim:14        /* Number of dimensions in
                                   the array */
4       short cbElements;      /* Size of an array element
                                   (bytes) */
5       long uiSize;           /* Size of the array, in
                                   bytes. */
6       void *pData;           /* Pointer to array data. */
7       Dimension *pDim;       /* Pointer to dimension
                                   information. */
8   } Array;
9   void *ADDR_ARRAY (Array *descriptor_ptr)
10  {
11      Return descriptor_ptr->pData;
12  }
```

CODE EXAMPLE 6

Line 9 indicates that the ADDR$_{13}$ARRAY function receives a descriptor pointer 702, representing a reference (i.e., an address) to an array descriptor 704 (which is preferably implemented as a structure). Line 9 also indicates that the ADDR$_{13}$ARRAY function returns a pointer (i.e., an address). In line 6, a pointer to the data in the array is declared for the array descriptor 704. In line 11, the pointer to the first element of the array is returned.

Example computer code for invoking the ADDR$_{13}$STRING function is shown in Code Example 7. This code is contained in the first application 104. For illustrative purposes, this code is written in BASIC, but it should be understood that this code could alternatively be written in any language that does not support pointers.

1 Declare function ADDR$_{13}$ARRAY (a as Any) as Long
2 Declare function SQLAllocConnect (ByVal henv as long, phdbc as long) as integer
3 Declare function SQLAllocEnv (phenv as long) as integer
4 Declare function SQLAllocStmt (ByVal hdbc as long, phstmt as long) as integer
5 Declare function SQLConnect (ByVal hdbc as long, ByVal szDSN as string, ByVal cbDSN as integer, ByVal szUID as string, ByVal cbUID as integer, ByVal szAuthStr as string, ByVal cbAuthStr as integer) as integer
6 Declare function SQLSetStmtOption (ByVal stmt as long, ByVal fOption as integer, ByVal vParam as long) as integer
7 Declare function SQLExecDirect (ByVal hstmt as long, ByVal szSqlStr as string, ByVal cbSqlStr as long) as integer
8 Declare function SQLBindCol (ByVal hstmt as long, ByVal icol as integer, ByVal fCType as integer, ByVal rgbValue as long, ByVal cbValueMax as long, pcbValue as long) as integer
9 Declare function SQLExtendedFetch (ByVal hstmt as long, ByVal fFetchType as integer, ByVal iRow as long, pcRow as long, rgfRowStatus as integer) as integer
10 Dim rc as integer 11 Dim henv as long, hdbc as long
12 Dim salarr(ROWSET$_{13}$SIZE) as string*COLWIDTH
13 Dim Row$_{13}$Stat(ROWSET$_{13}$SIZE) as integer
14 Dim stmt as string
15 stmt="SELECT SALARY FROM STAFF"
16 server="SAMPLE": uid="USERID": pwd="PASSWORD"
17 rc=SQLAllocEnv(henv)
18 rc=SQLAllocConnect(henv,hdbc)
19 rc=SQLAllocStmt(hdbc,hstmt)
20 r c=S Q L C o n n e c t ( h d b c , s e r v e r, len(server),uid,len(uid),pwd,len(pwd))
21 rc=SQLSetStmtOption(hstmt, SQL$_{13}$ROWSET$_{13}$SIZE, ROWSET$_{13}$SIZE)
22 rc=SQLExecDirect(hstmt, stmt, len(stmt))
23 rc=SQLBindCol (hstmt, 1, SQL$_{13}$BASIC$_{13}$STRING, ADDR$_{13}$ARRAY(salarr), ROWSET$_{13}$SIZE, COLWIDTH)
24 rc=SQLExtendedFetch(hstmt, SQL$_{13}$FETCH$_{13}$NEXT, 0, pcrow, Row$_{13}$Stat(0))

CODE EXAMPLE 7

Line 1 of Code Example 7, when executed, operates to declare the function ADDR$_{13}$ARRAY. Similar Declare statements in lines 2–9 exist for each of the well known ODBC APIs used in the example. For ease of readability (given that Code Example 7 is an example invocation of the ADDR$_{13}$ARRAY function), not all declarations are shown, and constants are not defined in Code Example 7.

Lines 15 and 16 initialize strings for the SQL SELECT statement to be executed and for the database, userid, and password to be used in connecting to the database.

Lines 17–19 allocate environment, connection, and statement handles.

Line 20 connects to the SAMPLE database.

Line 21 directs the database manager to return ROWSET$_{13}$SIZE rows for each extended fetch.

Line 22 executes the SQL SELECT statement, which directs the database manager to create a result set with one result column containing the salaries of the employees in the STAFF table.

Line 23 binds salarro array to the salary column of the result set by passing the address of the first element of the array with the size of each element of the array. The ADDR$_{13}$ARRAY function operates as described above and returns a pointer to the first element of salarr() to the SQLBindCol API.

Line 24 fetches ROWSET$_{13}$SIZE rows from the result set, which places ROWSET$_{13}$SIZE rows into the ROWSET$_{13}$SIZE elements of the salarr() array. Subsequent program code can reference the salary values directly from salarro, the BASIC array.

Operation of the First Application

Figure 6:
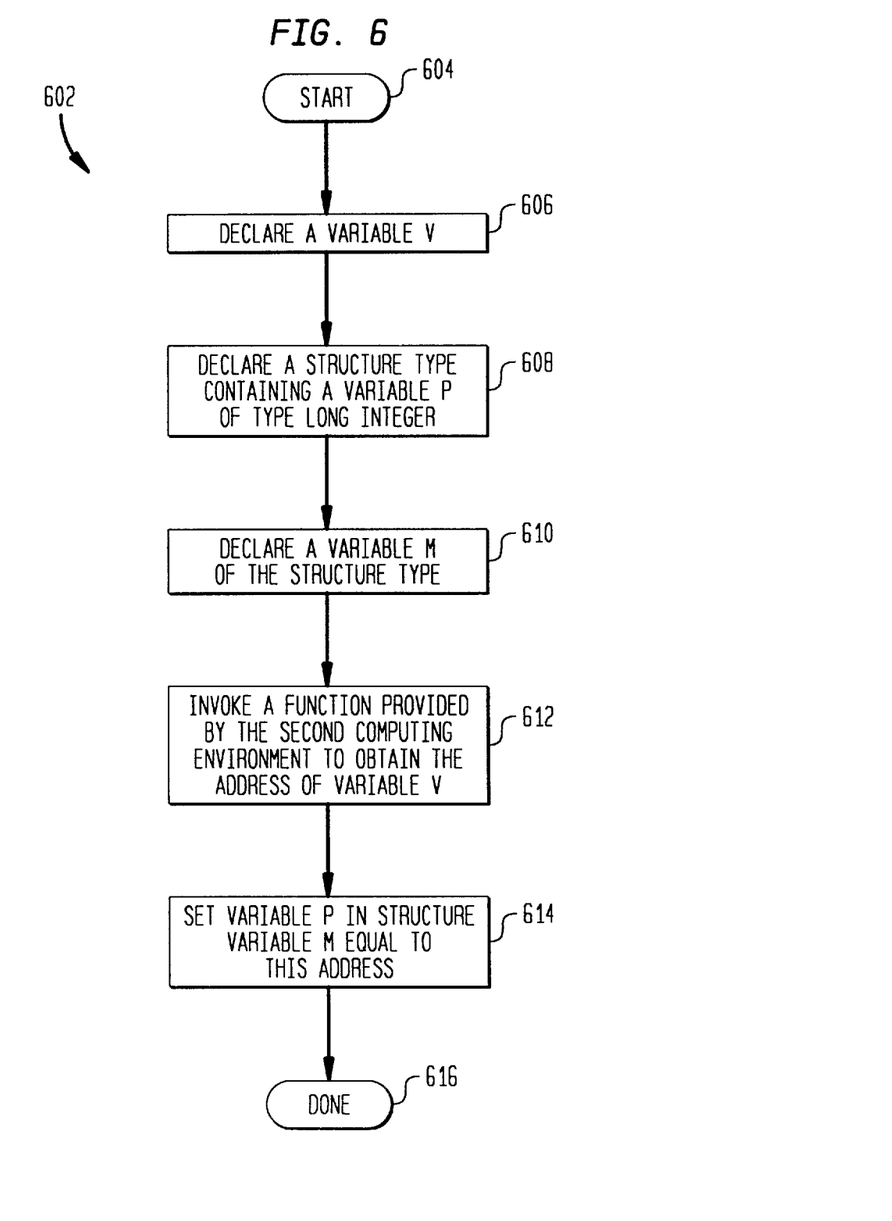

The operation of the first application 104 pertaining to the passing of a pointer shall now be described with reference to a flowchart 602 presented in FIG. 6. For illustrative purposes, flowchart 602 shall be described with respect to a scenario where the first application 104 is passing a structure containing a pointer to an external entity that supports pointers (the external entity represents something that is external to the first application 104, such as the second application 108 or a procedure from the procedure library 110, for example). Flowchart 602 begins with step 604, where control immediately passes to step 606.

In step 606, the first application 104 declares a variable v. Ultimately, a pointer to this variable v will be passed to the external entity.

In step 608, the first application 104 declares a structure type having a member p that is declared as a long integer. (More generally, variable p is declared as any data type wherein the memory allocated to an instance of the data type is greater than or equal to memory allocated to a pointer.)

In step 610, the first application 104 declares a variable M of the structure type.

In step 612, the first application 104 invokes either ADDR (if the variable v is not a string) or ADDR$_{13}$STRING (if the variable v is a string) to obtain the address of variable v.

In step 614, the first application 104 sets member p in variable M equal to this address of variable v.

Processing of flowchart 602 is now complete.

At this point, the first application 104 can pass variable M to an external entity (during a procedure invocation, for example). (Alternatively, the first application 104 can pass member p directly to the external entity.) Variable M contains the long integer member p that stores the address of variable v. From the perspective of the external entity, member p is a pointer (recall that pointers are the same size as long integers). Accordingly, the external entity can perform conventional pointer operations using member p. As just one example, the external entity can utilize member p to gain access to variable v. Other pointer operations will be apparent to persons skilled in the relevant art(s).

Note that the first application 104 cannot perform pointer operations using member p, even though member p stores the address of variable v. This is the case, because the first application 104 was written in a computer programming language that does not support or recognize pointers. Thus, the first application 104 cannot process or manipulate pointers.

Accordingly, the invention enables the first application 104 to pass pointers to external entities that support pointers. However, the invention does not enable the first application 104 to itself utilize pointers. This represents an advantage of the invention, since pointer manipulation represents a powerful yet dangerous functionality. It is not advantageous to allow such functionality to exist in interpreter execution environments, such as BASIC, where uncompiled computer programs are executed (since the checks associated with compilation would not be present).

Example computer code for implementing that part of the first application 104 that passes pointers is presented in Code Example 6. For illustrative purposes, this code is written in BASIC, but it should be understood that this code could alternatively be written in any language that does not support pointers.

1 declare function ADDR$_{13}$STRING (y as any) as long
2 dim v as string
3 type pointer$_{13}$inside
4 p as long
5 end type
6 dim m as pointer$_{13}$inside
7 m.p=ADDR$_{13}$STRING(v)

CODE EXAMPLE 6

In line 1, the first application 104 declares the ADDR$_{13}$STRING function so it can invoke this function later. In line 2, the first application 104 declares variable v as a string. In lines 3–5, the first application 104 declares a new structure type called pointer$_{13}$inside that contains a member p declared as long integer (line 4). In line 6, the first application 104 declares a variable m as a pointer$_{13}$inside structure. In line 7, the first application 104 invokes the ADDR$_{13}$STRING and sets member p in variable m equal to the returned address of variable v. At this point, the first application 104 can pass variable m to an external entity.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Having thus described our invention, what we claim as new and desire to secure by letters patent is:

1. A method performed by an application representing a computer program executing in a computer system, the computer program written in a computer programming language that does not support pointers, the method enabling the application to pass a pointer to an external entity, the method comprising the steps of:
   (1) declaring a variable V;
   (2) declaring a structure type having a member P;
   (3) declaring a variable M of said structure type;
   (4) invoking a function written in a computer programming language that supports pointers, a reference to said variable V being passed to said function, said function when executed obtaining and returning an address of said variable V;
   (5) setting said member P in said variable M equal to said address of said variable V; and
   (6) passing said variable M to an external entity.

2. The method of claim 1, wherein step (2) comprises the step of:
   declaring a structure type having a member P of a data type, wherein memory allocated to an instance of said data type is greater than or equal to memory allocated to a pointer.

3. The method of claim 2, wherein said data type is equal to long integer.

4. The method of claim 1, wherein in step (1) said variable V is declared as a non-string, and wherein step (4) comprises the step of:
   invoking an ADDR function written in a computer programming language that supports pointers, a reference to said variable V being passed to said ADDR function, said ADDR function when executed performing the steps of:
   (i) receiving said reference to said variable V; and
   (ii) returning said reference to said variable V.

5. The method of claim 1, wherein in step (1) said variable V is declared as a string, and wherein step (4) comprises the step of:
   invoking an $ADDR_{13}STRING$ function written in a computer programming language that supports pointers, a reference to a handle associated with said variable V being passed to said $ADDR_{13}STRING$ function, said $ADDR_{13}STRING$ function when executed performing the steps of:
   (i) receiving said handle reference;
   (ii) utilizing said handle reference to access said handle and to retrieve a string pointer stored therein, said string pointer referencing said variable V; and
   (iii) returning said string pointer.

6. The method of claim 5, wherein said $ADDR_{13}STRING$ function when executed further performs the following step between steps (ii) and (iii):
   locking said string pointer so as to prevent said string pointer from changing.

7. The method of claim 1, wherein in step (1) said variable V is declared as an array, and wherein step (4) comprises the step of:
   invoking an $ADDR_{13}ARRAY$ function written in a computer programming language that supports pointers, a reference to an array descriptor associated with said variable V being passed to said $ADDR_{13}ARRAY$ function, said $ADDR_{13}ARRAY$ function when executed performing the steps of:
   (i) receiving said array descriptor reference;
   (ii) using said array descriptor reference to access said array descriptor and to retrieve a pointer stored therein, said pointer referencing a data element of said variable V; and
   (iii) returning said pointer.

8. The method of claim 1, wherein in step (1) said variable V is declared as a data type or structure for which a memory location of said variable V is not equal to a memory location of data associated with said variable V, and wherein said function when invoked in step (4) obtains and returns a pointer that references said memory location containing said data associated with said variable V.

9. The method of claim 1, wherein in step (4) said function receives a pointer to said variable V, said pointer not referencing a memory location of data associated with said variable V, and wherein said function when invoked in step (4) obtains and returns a pointer that references said memory location containing said data associated with said variable V.

10. A computer system having a memory and an application stored therein, the application including a module for enabling the application to pass a pointer to an external entity, the application representing a computer program executing in the computer system, the computer program written in a computer programming language that does not support pointers, the module comprising:
    first declaring means for declaring a variable V;
    second declaring means for declaring a structure type having a member P;
    third declaring means for declaring a variable M of said structure type;
    invoking means for invoking a function written in a computer programming language that supports pointers, a reference to said variable V being passed to said function, said function when executed obtaining and returning an address of said variable V;
    setting means for setting said member P in said variable M equal to said address of said variable V; and
    passing means for passing said variable M to an external entity.

11. The system of claim 10, wherein said second declaring means comprises:
    means for declaring a structure type having a member P of a data type, wherein memory allocated to an instance of said data type is greater than or equal to memory allocated to a pointer.

12. The system of claim 11, wherein said data type is equal to long integer.

13. The system of claim 10, wherein said first declaring means declares said variable V as a non-string, and wherein said invoking means comprises:
    means for invoking an ADDR function written in a computer programming language that supports pointers, a reference to said variable V being passed to said ADDR function, said ADDR function when executed performing the steps of:

(i) receiving said reference to said variable V; and (ii) returning said reference to said variable V.

14. The system of claim 10, wherein said first declaring means declares said variable V as a string, and wherein said invoking means comprises:

means for invoking an $ADDR_{13}STRING$ function written in a computer programming language that supports pointers, a reference to said variable V being passed to said $ADDR_{13}STRING$ function, said $ADDR_{13}STRING$ function when executed performing the steps of:

(i) receiving said handle reference;

(ii) utilizing said handle reference to access said handle and to retrieve a string pointer stored therein, said string pointer referencing said variable V; and (iii) returning said string pointer.

15. The system of claim 14, wherein said $ADDR_{13}STRING$ function when executed further performs the following step between steps (ii) and (iii):

locking said string pointer so as to prevent said string pointer from changing.

16. The system of claim 10, wherein said first declaring means declares said variable V as an array, and wherein said invoking means comprises:

means for invoking an $ADDR_{13}ARRAY$ function written in a computer programming language that supports pointers, a reference to a descriptor for said variable V being passed to said $ADDR_{13}ARRAY$ function, said $ADDR_{13}ARRAY$ function when executed performing the steps of:

(i) receiving said descriptor reference;

(ii) using said descriptor reference to access said descriptor and to retrieve a pointer stored therein, said pointer referencing a data element of said variable V; and (iii) returning said pointer.

17. The system of claim 10, wherein said function invoked by said invoking means receives a pointer to said variable V, said pointer not referencing a memory location of data associated with said variable V, and wherein said function when executed obtains and returns a pointer that references said memory location containing said data associated with said variable V.

18. A database system, comprising:

a client;

a server coupled to said client and comprising a procedure library, said procedure library including a function that, when executed, obtains and returns an address of a parameter passed to said function; and an application executing in said client, said application being an invocation of a computer program written in a computer programming language that does not support pointers, said application comprising:

first declaring means for declaring a variable V;

second declaring means for declaring a structure type having a member P;

third declaring means for declaring a variable M of said structure type;

invoking means for invoking said function in said procedure library, a reference to said variable V being passed to said function, said function when executed obtaining and returning an address of said variable V;

setting means for setting said member P in said variable M equal to said address of said variable V; and passing means for passing said variable M to an external entity executing in said server, said external entity being an invocation of a computer program written in a computer programming language that supports pointers.

19. The database system of claim 18, wherein said second declaring means comprises:

means for declaring a structure type having a member P of a data type, wherein memory allocated to an instance of said data type is greater than or equal to memory allocated to a pointer.

20. The database system of claim 19, wherein said data type is equal to long integer.

21. The database system of claim 18, wherein said first declaring means declares said variable V as a non-string, and wherein said procedure library includes an ADDR function written in a computer programming language that supports pointers, and wherein said invoking means comprises:

means for invoking said ADDR function, a reference to said variable V being passed to said ADDR function, said ADDR function when executed performing the steps of:

(i) receiving said reference to said variable V; and (ii) returning said reference to said variable V.

22. The database system of claim 18, wherein said first declaring means declares said variable V as a string, and wherein said procedure library includes an $ADDR_{13}STRING$ function written in a computer programming language that supports pointers, and wherein said invoking means comprises:

means for invoking said $ADDR_{13}STRING$ function, a reference to said variable V being passed to said $ADDR_{13}STRING$ function, said $ADDR_{13}STRING$ function when executed performing the steps of:

(i) receiving said handle reference;

(ii) utilizing said handle reference to access said handle and to retrieve a string pointer stored therein, said string pointer referencing said variable V; and (iii) returning said string pointer.

23. The database system of claim 22, wherein said $ADDR_{13}STRING$ function when executed further performs the following step between steps (ii) and (iii):

locking said string pointer so as to prevent said string pointer from changing.

24. The database system of claim 18, wherein said procedure library represents a dynamic link library, and wherein said application represents a computer program written in BASIC and being executed by an interpreter in said client.

25. A program storage device readable by a machine, tangibly embodying a program of instructions executable by the machine to perform method steps for enabling an application to pass a pointer to an external entity, the application representing a computer program executing in the machine, the computer program written in a computer programming language that does not support pointers, said method steps comprising:

(1) declaring a variable V;

(2) declaring a structure type having a member P;

(3) declaring a variable M of said structure type;

(4) invoking a function written in a computer programming language that supports pointers, a reference to said variable V being passed to said function, said function when executed obtaining and returning an address of said variable V;

(5) setting said member P in said variable M equal to said address of said variable V; and (6) passing said variable M to an external entity.

26. The program storage device of claim 25, wherein step (2) comprises the step of:

declaring a structure type having a member P of a data type, wherein memory allocated to an instance of said data type is greater than or equal to memory allocated to a pointer.

27. The program storage device of claim 26, wherein said data type is equal to long integer.

28. The program storage device of claim 25, wherein in step (1) said variable V is declared as a non-string, and wherein step (4) comprises the step of:

invoking an ADDR function written in a computer programming language that supports pointers, a reference to said variable V being passed to said ADDR function, said ADDR function when executed performing the steps of:
  (i) receiving said reference to said variable V; and
  (ii) returning said reference to said variable V.

29. The program storage device of claim 25, wherein in step (1) said variable V is declared as a string, and wherein step (4) comprises the step of:

invoking an $ADDR_{13}STRING$ function written in a computer programming language that supports pointers, a reference to a handle associated with said variable V being passed to said $ADDR_{13}STRING$ function, said $ADDR_{13}STRING$ function when executed performing the steps of:
  (i) receiving said handle reference;
  (ii) utilizing said handle reference to access said handle and to retrieve a string pointer stored therein, said string pointer referencing said variable V; and
  (iii) returning said string pointer.

30. The program storage device of claim 29, wherein said $ADDR_{13}STRING$ function when executed further performs the following step between steps (ii) and (iii):

locking said string pointer so as to prevent said string pointer from changing.

31. The program storage device of claim 25, wherein in step (1) said variable V is declared as an array, and wherein step (4) comprises the step of:

invoking an $ADDR_{13}ARRAY$ function written in a computer programming language that supports pointers, a reference to an array descriptor associated with said variable V being passed to said $ADDR_{13}ARRAY$ function, said $ADDR_{13}ARRAY$ function when executed performing the steps of:
  (i) receiving said array descriptor reference;
  (ii) using said array descriptor reference to access said array descriptor and to retrieve a pointer stored therein, said pointer referencing a data element of said variable V; and
  (iii) returning said pointer.

32. The program storage device of claim 25, wherein in step (1) said variable V is declared as a data type or structure for which a memory location of said variable V is not equal to a memory location of data associated with said variable V, and wherein said function when invoked in step (4) obtains and returns a pointer that references said memory location containing said data associated with said variable V.

33. The program storage device of claim 25, wherein in step (4) said function receives a pointer to said variable V, said pointer not referencing a memory location of data associated with said variable V, and wherein said function when invoked in step (4) obtains and returns a pointer that references said memory location containing said data associated with said variable V.

34. A computer program product comprising a computer useable medium having computer program logic recorded thereon for enabling a processor in a computer system to enable an application to pass a pointer to an external entity, the application representing a computer program executing in the computer system, the computer program written in a computer programming language that does not support pointers, said computer program logic comprising:

first declaring means for enabling the processor to declare a variable V;

second declaring means for enabling the processor to declare a structure type having a member P;

third declaring means for enabling the processor to declare a variable M of said structure type;

invoking means for enabling the processor to invoke a function written in a computer programming language that supports pointers, a reference to said variable V being passed to said function, said function when executed enabling the processor to obtain and return an address of said variable V;

setting means for enabling the processor to set said member P in said variable M equal to said address of said variable V; and passing means for enabling the processor to pass said variable M to an external entity.

35. The computer program product of claim 34, wherein said second declaring means comprises:

means for enabling the processor to declare a structure type having a member P of a data type, wherein memory allocated to an instance of said data type is greater than or equal to memory allocated to a pointer.

36. The computer program product of claim 35, wherein said data type is equal to long integer.

37. The computer program product of claim 34, wherein said first declaring means enables the processor to declare said variable V as a non-string, and wherein said invoking means comprises:

means for enabling the processor to invoke an ADDR function written in a computer programming language that supports pointers, a reference to said variable V being passed to said ADDR function, said ADDR function when executed enabling the processor to perform the steps of:
  (i) receiving said reference to said variable V; and
  (ii) returning said reference to said variable V.

38. The computer program product of claim 34, wherein said first declaring means enables the processor to declare said variable V as a string, and wherein said invoking means comprises:

means for enabling the processor to invoke an $ADDR_{13}STRING$ function written in a computer programming language that supports pointers, a reference to said variable V being passed to said $ADDR_{13}STRING$ function, said $ADDR_{13}STRING$ function when executed enabling the processor to perform the steps of:
  (i) receiving said handle reference;
  (ii) utilizing said handle reference to access said handle and to retrieve a string pointer stored therein, said string pointer referencing said variable V; and
  (iii) returning said string pointer.

39. The computer program product of claim 38, wherein said $ADDR_{13}STRING$ function when executed further enables the processor to perform the following step between steps (ii) and (iii):

locking said string pointer so as to prevent said string pointer from changing.

40. The computer program product of claim 34, wherein said first declaring means enables the processor to declare said variable V as an array, and wherein said invoking means comprises:

means for enabling the processor to invoke an $ADDR_{13}ARRAY$ function written in a computer programming language that supports pointers, a reference to a descriptor for said variable V being passed to said $ADDR_{13}ARRAY$ function, said $ADDR_{13}ARRAY$ function when executed enabling the processor to perform the steps of:

(i) receiving said descriptor reference;

(ii) using said descriptor reference to access said descriptor and to retrieve a pointer stored therein, said pointer referencing a data element of said variable V; and (iii) returning said pointer.

41. The computer program product of claim 34, wherein said function invoked by said invoking means receives a pointer to said variable V, said pointer not referencing a memory location of data associated with said variable V, and wherein said function when executed enables the processor to obtain and return a pointer that references said memory location containing said data associated with said variable V.

* * * * *